(12) United States Patent
Giallorenzi et al.

(10) Patent No.: US 7,664,164 B1
(45) Date of Patent: Feb. 16, 2010

(54) CORRELATION APPARATUS AND METHOD FOR ACCOMODATING SPREADING CODE FREQUENCY OFFSET

(75) Inventors: Thomas R. Giallorenzi, Herriman, UT (US); Johnny M. Harris, Centerville, UT (US); Dan M. Griffin, Bountiful, UT (US); Richard Ertel, Sandy, UT (US); Eric K. Hall, Sandy, UT (US)

(73) Assignee: L-3 Communications, Corp., New York, NY (US)

( * ) Notice: Subject to any disclaimer, the term of this patent is extended or adjusted under 35 U.S.C. 154(b) by 667 days.

(21) Appl. No.: 11/351,465

(22) Filed: Feb. 10, 2006

(51) Int. Cl.
*H04B 1/00* (2006.01)

(52) U.S. Cl. .................. 375/150; 375/147; 375/140; 375/130; 375/343; 375/340; 375/316; 375/148; 375/141

(58) Field of Classification Search ............... 375/150, 375/147, 140, 130, 343, 340, 316, 148, 141
See application file for complete search history.

(56) References Cited

U.S. PATENT DOCUMENTS

| | | | |
|---|---|---|---|
| 4,621,365 A | 11/1986 | Chiu | |
| 5,003,552 A | 3/1991 | Mower | |
| 5,285,472 A | 2/1994 | Leonard et al. | |
| 5,566,202 A | 10/1996 | Lang | |
| 5,774,494 A | 6/1998 | Sawahashi et al. | |
| 5,960,028 A * | 9/1999 | Okamoto et al. | 375/130 |
| 6,069,915 A * | 5/2000 | Hulbert | 375/150 |
| 6,111,911 A | 8/2000 | Sanderford, Jr. et al. | |
| 6,134,286 A | 10/2000 | Chennakeshu et al. | |
| 6,151,353 A | 11/2000 | Harrison et al. | |
| 6,169,731 B1 | 1/2001 | Stewart et al. | |
| 6,249,539 B1 | 6/2001 | Harms et al. | |
| 6,282,232 B1 | 8/2001 | Fleming, III et al. | |
| 6,323,805 B1 | 11/2001 | Zou et al. | |
| 6,324,227 B1 | 11/2001 | Kang et al. | |
| 6,396,819 B1 | 5/2002 | Fleeter et al. | |
| 6,407,699 B1 | 6/2002 | Yang | |
| 2001/0014114 A1* | 8/2001 | Baltersee et al. | 375/148 |
| 2003/0112856 A1* | 6/2003 | Challa et al. | 375/148 |
| 2003/0235238 A1* | 12/2003 | Schelm et al. | 375/148 |
| 2004/0071200 A1* | 4/2004 | Betz et al. | 375/152 |

* cited by examiner

*Primary Examiner*—David C Payne
*Assistant Examiner*—Zewdu Kassa
(74) *Attorney, Agent, or Firm*—Kirton & McConkie; William T. Ralston

(57) ABSTRACT

An apparatus and method for correlating a signal over a correlation interval while accommodating spreading code frequency offset is described. In one embodiment, the apparatus includes a plurality of correlators, where each correlator forms a correlation result corresponding to a unique code frequency offset hypothesis. Each correlator selects samples from a tapped delay line at a tap position moved along the delay line at a rate corresponding to the correlator unique code frequency offset hypothesis.

31 Claims, 9 Drawing Sheets

Correlator Tap Locations versus Chip Time

| Frequency Offset Hypothesis | Chip Time | | | | | | | | | | | |
|---|---|---|---|---|---|---|---|---|---|---|---|---|
| | 1-49 | 49-99 | 100-149 | 149-199 | 200-249 | 249-299 | 300-349 | 349-399 | 400-449 | 449-499 | 500-549 | 549-599 |
| -3 | 3 | 3 | 3 | 3 | 2 | 2 | 2 | 2 | 1 | 1 | 1 | 1 |
| -2 | 3 | 3 | 3 | 2 | 2 | 2 | 2 | 2 | 2 | 1 | 1 | 1 |
| -1 | 2 | 2 | 2 | 2 | 2 | 2 | 1 | 1 | 1 | 1 | 1 | 1 |
| 0 | 2 | 2 | 2 | 2 | 2 | 2 | 2 | 2 | 2 | 2 | 2 | 2 |
| 1 | 2 | 2 | 2 | 2 | 2 | 2 | 3 | 3 | 3 | 3 | 3 | 3 |
| 2 | 1 | 1 | 1 | 1 | 2 | 2 | 2 | 2 | 2 | 3 | 3 | 3 |
| 3 | 1 | 1 | 1 | 1 | 2 | 2 | 2 | 2 | 3 | 3 | 3 | 3 |

← Correlation Interval →

FIG. 2

CORRELATION APPARATUS AND METHOD FOR ACCOMODATING SPREADING CODE FREQUENCY OFFSET

FIELD OF THE INVENTION

The present invention relates generally to the correlation of signals, and more particularly to accommodating spreading code frequency offset while correlating a signal.

BACKGROUND

Spread spectrum techniques have proven useful in a variety of communications applications, including cellular telephones, wireless local area networks, and military communications. One advantage of spread spectrum techniques is the ability to build a transmitter which is difficult for an unauthorized user to detect.

Wireless spread spectrum systems use a relatively large amount of spectrum bandwidth to communicate their signals. The large bandwidth is consumed by spread spectrum encoding the transmission using a spreading code. The two most common types of spread spectrum encoding are frequency hopping where a pseudonoise spreading code is used to pseudorandomly change the transmission frequency on a periodic basis, and direct sequence where the pseudonoise spreading code is used to modulate the transmit signal at a high rate relative to the underlying message data. The spread code is a pseudorandom sequence of symbols that can be generated by a transmitter, and also generated by a receiver which knows the characteristics of the code. Each symbol of the pseudorandom sequence is generally referred to as a chip. The time duration of a chip can be referred to as a chip time, and hence the chip rate (or spreading code frequency) is the reciprocal of the chip time. The chip rate is usually at least an order of magnitude higher than the data rate of the underlying information to be transmitted.

Correlation can be used to detect a spread spectrum transmission and to extract the data from a spread spectrum transmission. Correlation typically performs a chip by chip comparison between a received signal and a local code reference, summing these comparison results over many chip intervals, the overall length referred to as the "correlation interval." For example, to extract data, a receiver typically performs a correlation of the spread spectrum signal with the spreading code over a correlation interval corresponding to one symbol of underlying information. If the so-called processing gain is high (many spreading code chips for each information symbol), this correlation interval may span an interval of many chips. For example, systems are known which use processing gain in excess of 1000, in which case each symbol spans 1000 chips. For detecting a spread spectrum transmission, even longer correlation intervals are often used which span many symbols and, thus, many thousands of chips.

Long correlation intervals can cause problems when the spreading code rate received doesn't match that expected by the correlator. This difference, referred to as spreading code frequency offset, causes phase drift of the received signal relative to the local code reference. This drift can thus accumulate during the correlation interval. Hence, where the phase of the received signal and the local code reference may start out aligned at the beginning of the correlation interval, they may be misaligned (perhaps by several chip times) by the end of the correlation interval. This misalignment results in a loss in the correlator output, reducing the signal to noise ratio. Effects of this loss can include reduced probability of detection, increased symbol error rates during data extraction, and complete loss of synchronization.

One approach to solving the problems caused by code frequency offset is to limit the length of the correlation interval. Limiting the length of the correlation can reduce the effects of code frequency offset because there is less time for the code phase to drift. The reduced length, however, also results in a reduction in signal to noise ratio. Hence, to accommodate large code frequency offset using a shorter correlation interval may result in inadequate signal to noise ratio.

An alternative approach, applicable to signal detection, is to include complex clocking circuitry to provide multiple local code references which advance at slightly different frequencies. Hence, correlators using different rate local references can accommodate different code frequency offset. Unfortunately, the complexity of the multiple clocking can increase costs. Furthermore, it is difficult to accommodate these multiple slightly different clock rates in a synchronous logic design.

SUMMARY OF THE INVENTION

It has been recognized that it would be advantageous to develop a method and apparatus for correlating a signal which can accommodate spreading code frequency offset.

In one embodiment of the present invention, an apparatus for correlating a signal over a correlation interval includes a sampler. The sampler is configured to accept the signal and form a plurality of signal samples. The apparatus may also include a tapped delay line coupled to the sampler and configured to accept the plurality of signal samples and output delayed signal samples at a plurality of taps. Successive taps provide an increased relative delay to the signal samples. The apparatus may also include a plurality of correlators coupled to the tapped delay line. Each correlator is configured to form a correlation result from a plurality of selected delayed signal samples. The selected delayed signal samples for each correlator correspond to the correlation interval, and are taken from a tap location that may be moved along the tapped delay line at a rate corresponding to a correlator unique code frequency offset hypothesis.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

FIG. 2 is a tabulation of seven different code frequency offset hypotheses accommodated by a three tap delay line using seven correlators in accordance with an embodiment of the present invention;

DETAILED DESCRIPTION

Figure 1:
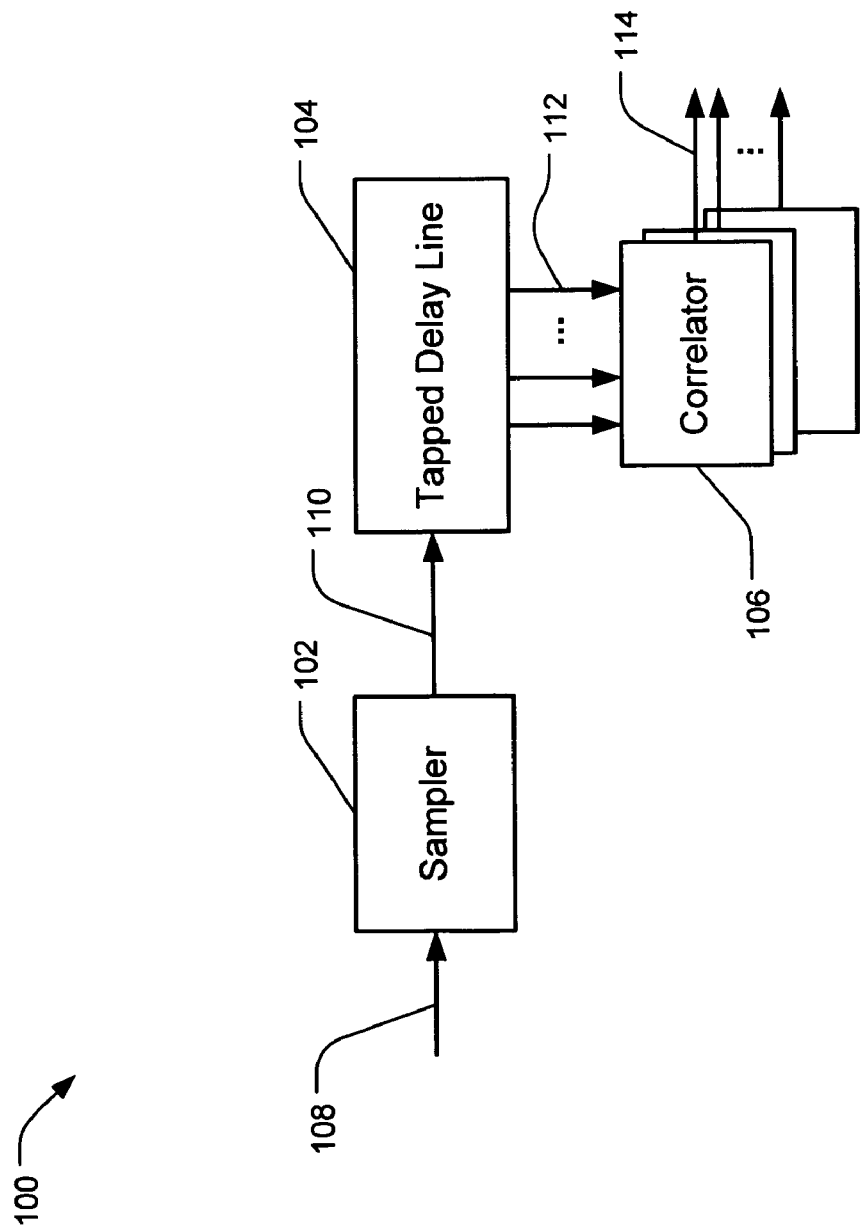
FIG. 1 is a block diagram of an apparatus for correlating a signal over a correlation interval in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

As illustrated in FIG. 1, in accordance with an embodiment of the present invention, an apparatus 100 for correlating a signal over a correlation interval is shown. The signal 108 may include a spread spectrum encoded transmission, as well as noise and other interfering signals. The apparatus can accommodate a spreading code frequency offset between the spread spectrum transmission embedded within the signal and a local timing reference used by the apparatus. For example, a spread spectrum communication system may be designed to use a nominal code frequency (chipping rate) of 10 MHz. The actual chipping rate of a spread spectrum transmission received by the apparatus may differ from 10 MHz due to such effect as Doppler shift or oscillator error in the transmission source. Similarly, oscillator error in a receiver may result in an apparent deviation of the received code frequency from that expected. Spreading code frequency offset, regardless of the source, can result in drift of the code phase during the correlation interval.

The apparatus 100 accommodates spreading code frequency offset by selecting which samples are used to perform a correlation over the correlation interval. The apparatus includes a means for forming a plurality of signal samples, for example a sampler 102, and a means for delaying the signal samples 110 to produce a plurality of delayed sample streams, for example a tapped delay line 104. For example, the sampler may be implemented by an analog to digital converter which provides discrete time, quantized digital samples of the signal 108. Alternately, the sampler may provide discrete time analog samples of the signal, for example using a sample and hold. The tapped delay line 104 is coupled to the sampler so as to accept the plurality of signal samples. For digitized signal samples, the tapped delay line may be implemented by digital electronics, including for example a discrete shift registers or integrated into an FPGA or ASIC. For analog signal samples, the tapped delay line may be implemented by a charge coupled device or analog delay line. The tapped delay outputs delayed signal samples 112 at a plurality of taps. Each successive tap provides increased relative delay to the signal samples. For example, if the tap spacing is set to one-half chip time, the increased relative delay is one chip time. In such a case, delayed signal samples from the first tap will be delayed by one-half chip time relative to the signal samples at the input of the tapped delay line, delayed signal samples from the second tap will be delayed by one chip time relative to the signal samples at the input, etc. For example, a tapped delay line with one-half chip time delays can be implemented by setting the sampling rate of the sampler to twice the chip rate, and providing one clock of delay per tap using a shift register or series of daisy-chained latches. Using a tap spacing of one-quarter or one-chip time may also prove useful. Various other combinations of sampling rate and delay per tap will occur to one of skill in the art and may prove advantageous depending upon the particular application.

The apparatus may also include a plurality of correlators 106 coupled to the tapped delay line. Each correlator forms a correlation result 114 from a set of selected delayed signal samples which correspond to the correlation interval. For example, if the correlation interval spans 1000 chip times, and the sample rate is twice the chip rate, each correlator will use a total of 2000 delayed signal samples. Each correlator performs the correlation for a unique code frequency offset hypothesis, and hence the set of selected delayed signal samples for each correlator is taken from a tap location that is moved along the tapped delay line during the correlation interval at a rate corresponding to that hypothesis. For example, for a code frequency offset hypothesis of zero, there is assumed to be no code phase drift during the correlation interval, and thus the tap location is not moved. When there is a positive code frequency offset (that is, the code frequency of the spread spectrum transmission embedded in the signal is higher than expected), the code phase slowly drifts earlier in time. Hence, to compensate for the positive frequency offset, the tap location is moved along the tapped delay line towards taps with less relative delay (e.g., to the left in FIG. 1). Conversely, when there is a negative code frequency offset (the code frequency is lower than expected) the code phase slowly drifts later in time, and the tap location is moved towards taps with more relative delay (e.g., to the right in FIG. 1).

Moving the tap location along the delay line compensates for phase drift according to the hypothesized code frequency offset. Because the compensation is performed by moving the tap location, complex clocking circuitry as used by some prior approaches is avoided. Overall, the apparatus is thus relatively simple compared to some complex approaches previously used. For example, the apparatus 100 may be implemented in entirely synchronous logic, for example an application specific integrated circuit (ASIC) or field programmable gate array (FPGA).

The operation of the correlators may be understood further by reference to a more specific example. An exemplary correlation interval of 600 chip times is used, and the tapped delay line is configured with taps of one chip time relative delay. Consider a spread spectrum encoded transmission embedded within the signal, but the transmission has a code frequency offset which results in the code phase drifting by two full chip times over the correlation interval. In other words, the code phase drifts by one chip time each 300 chips of the correlation interval. A correlator which is not configured to accommodate this code frequency offset will thus fail to be to be aligned with the spread spectrum encoded signal over the entire correlation interval, and thus full to collect all of the energy of the spread spectrum encoded signal. For example, if the correlator starts perfectly aligned with the signal, within 150 chip times it will be misaligned by one-half chip time, and within 300 chip times it will be misaligned by a full chip time. Thus, the correlator could potentially collect less than half of the available energy available during the 600 chip time correlation interval. The actual loss observed in a mismatched correlator depends on a number of factors, including the pulse shaping used at the transmitter, filtering in the receiver, and the initial phase of the signal relative to the correlator timing.

A correlator in accordance with an embodiment of the present invention can accommodate this moving phase by moving the tap location by one position after every 300 chips of the correlation interval. Hence, a tapped delay line of at least three taps long, with one chip spacing between taps can accommodate the offset in this example.

Multiple correlators may be included to accommodate multiple code frequency offsets. For example, FIG. 2 provides a tabulation of the seven different code frequency offset hypotheses that can be accommodated by a three tap delay line combined with seven correlators in accordance with one embodiment of the present invention. The tap locations are numbered from 1 to 3, with 1 being the minimum relative delay and 3 being the maximum relative delay. The code frequency offset hypotheses cover drift rates from −3 chips over the correlation interval to +3 chips over the correlation interval. For example, looking at the hypothesis of −3 chips per correlation interval drift in FIG. 2, the correlator tap location is tap 3 during chip time 1 through 199 (the first third of the correlation interval), tap 2 during chip time 200 through 399 (the middle third of the correlation interval), and tap 1 during chip time 400 through 599 (the last third of the correlation interval). The correlator for the hypothesis of +3 moves in the opposite direction, moving from tap 1, to tap 2, to tap 3, and transitions at the same times as the correlator for the hypothesis of −3. The correlators for the hypotheses of +1 and −1 each change tap location in the middle of the correlation interval, both using tap 2 for the first half of the correlation interval and tap 3 and tap 2, respectively, during the second half of the correlation interval. The correlator for the hypothesis of 0 uses a fixed tap location. The particular tap location chosen by each correlator at each sample time thus corresponds to the tap location that most closely matches the expected phase of the signal during that chip time for the code frequency offset hypothesis of that correlator. Thus, during different portions of the correlation interval, each correlator may use a different tap location.

In general, the apparatus 100 (FIG. 1) is easily extendible to cover almost any range of frequency offset hypotheses desired by selecting a suitable length for the tapped delay line and moving the correlator tap locations along the tapped delay line appropriately. Hence, even very wide ranges of possible code frequency offset can be accommodated, such as those caused by high Doppler frequency shifts in a mobile or satellite communication system. Alternately, because large code frequency offsets can be accommodated, less accurate oscillators can be used, which may reduce the costs of components used in the communication system. Of course, fewer correlators can also be used, covering smaller ranges of frequency offset if desired.

Figure 3:
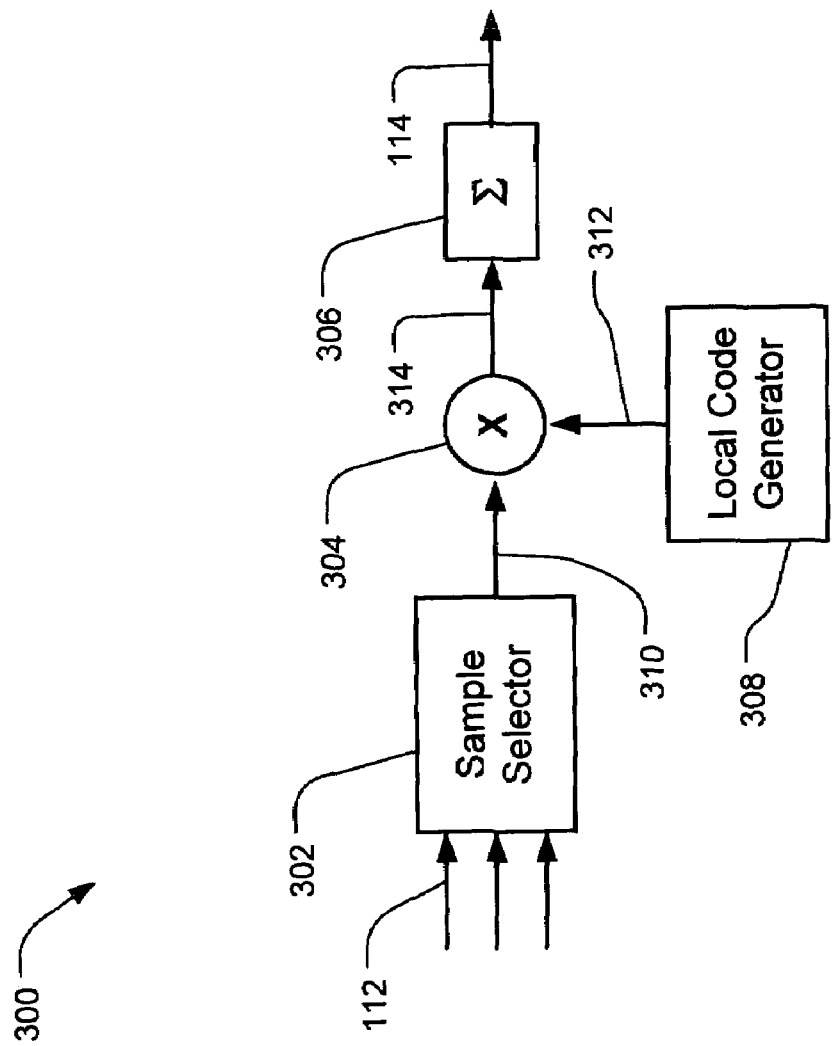
FIG. 3 is a detailed block diagram of a correlator in accordance with an embodiment of the present invention.

One detailed implementation of an embodiment of a correlator 300 is shown in block diagram form in FIG. 3. A means for selecting a plurality of selected samples corresponding to the correlation interval can be provided by, for example, a sample selector 302. Various implementations of a sample selector may be used. For example, the sample selector may be implemented as a switch or multiplexer with inputs coupled to the tapped delay line and the switched/multiplexed output providing the selected samples 310. Alternately, if the tapped delay line 104 (FIG. 1) is implemented by a digital memory, the sample selector may be implemented by an address generator which addresses the tapped delay line memory so as to provide selected samples at the output of the memory. Various other implementations of the sample selector will occur to one of skill in the art having possession of this disclosure.

In one embodiment of the present invention, means for correlating the plurality of selected samples is provided by a multiplier 304 coupled to a summer 306. The selected samples 310 are chip-by-chip multiplied by a local code 312 generated by a local code generator 308. The resulting multiplied samples 314 are summed by a summer 306 to produce the correlation result 114. Other techniques of implementing a correlator are also known in the art, and may be used with embodiments of the present invention.

In accordance with an alternate embodiment of the present invention, the sampler 102 may include a matched filter configured to perform a matched filtering operation on the signal and output signal samples. For example, a matched filter can be implemented with a finite impulse response filter having taps set equal to the complex conjugate of the spreading code, in which case the matched filter performs a despreading function. In such a case, the local code generator and multiplier can be eliminated, and the means for correlating provided by a means for summing, including for example the summer 306. Selected samples 310 are provided directly to the summer to form the correlation result 114.

As discussed above, correlation is a useful technique for detecting the presence of a spread spectrum transmission having a particular spreading code by correlating an incoming signal with that particular spreading code. For example, commonly owned co-pending U.S. patent application Ser. No. 11/351,464, entitled Spread Spectrum Detection System and Method describes a spread spectrum system in which embodiments of the present invention may be employed.

Figure 4:
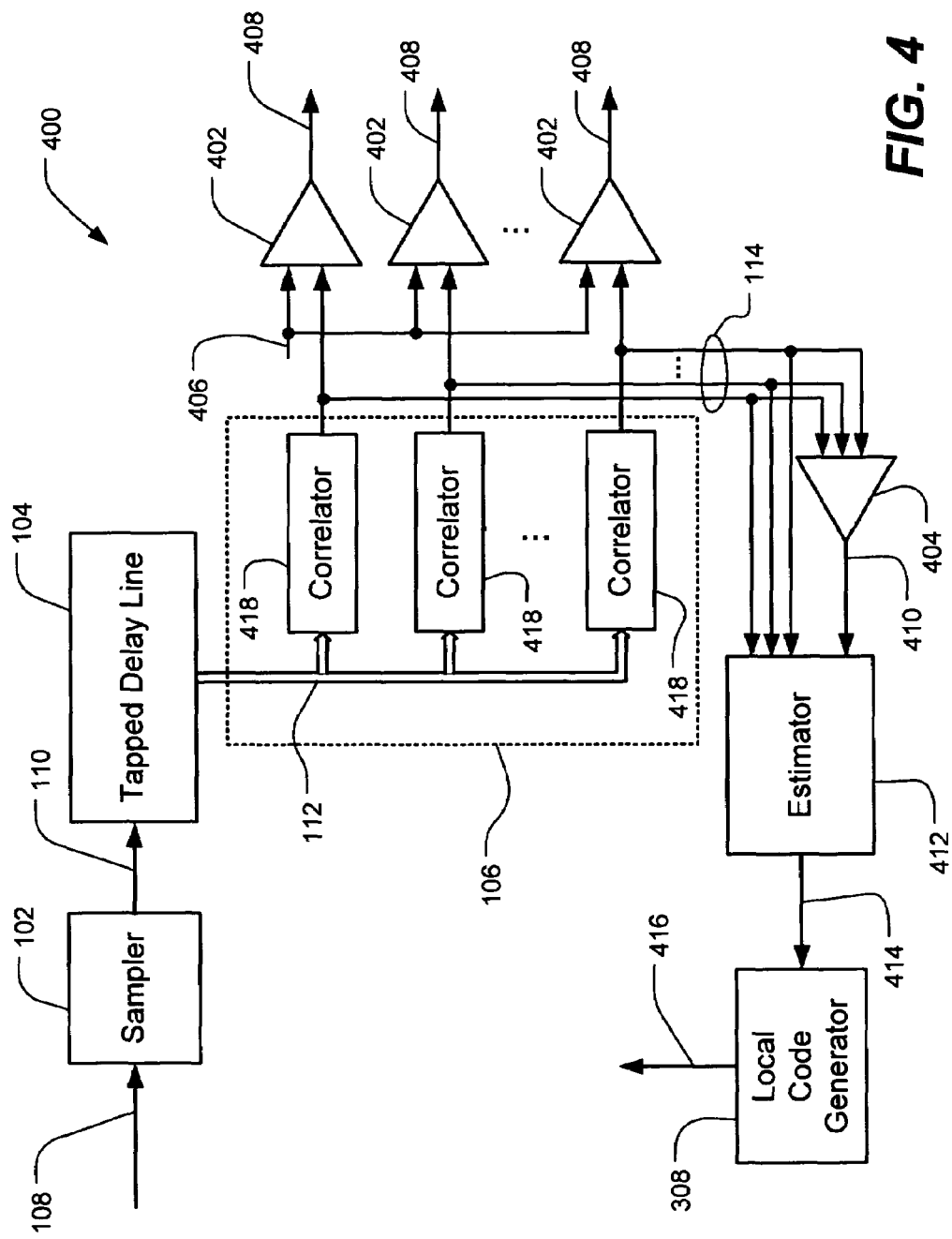
FIG. 4 is a block diagram of an apparatus for correlating a signal over a correlation interval in accordance with another embodiment of the present invention.

FIG. 4 illustrates an apparatus 400 for correlating a signal over a correlation interval in accordance with another embodiment of the present invention. The incoming signal 108 is received by a sampler 102, as discussed above. Signal samples 110 from the sampler are delayed by a tapped delay line 104 to produce delayed samples 112 which are provided to a plurality of correlators 106. Each correlator 418 is configured to calculate a correlation result 114 for a correlator unique code offset frequency hypothesis, for example as discussed above.

The apparatus 400 may include a first comparator 402 coupled to the plurality of correlators and configured to compare the correlation results 114 to a threshold 406 to detect the presence of a spread spectrum signal. The output of the first comparator is thus a signal present declaration 408. For example, the threshold may be set based on a predetermined level that the correlation result is to exceed to ensure a high probability that a spread spectrum having the particular spreading code is actually present in the signal. Alternately, the threshold may be set based on a previously determined average noise level, for example, by using a scaled average of correlation results determined previously in time.

Because the correlation is performed using samples which have been selected to correspond to a hypothesis code frequency offset (and hence phase drift), losses associated with the phase drift can be reduced. For example, as discussed above, a spread spectrum encoded transmission which drifts in code phase over the correlation interval results in loss relative to a transmission with no code phase drift. The actual amount of loss depends in part on the particular transmit pulse shaping and receive matched filtering used. The correlator matched to this phase drift rate, however, will result in relatively little loss. Hence, the apparatus 400 can provide improved signal to noise ratio in the correlation result for signals which have a code frequency offset.

Multiple different code frequency offsets can be accommodated in the apparatus 400, improving the likelihood that one of the correlators 418 provides a high signal to noise ratio correlation result 114. For example, the expected range of code frequency offset may be covered by a number of code frequency offset hypotheses, each spaced such that the code phase will not drift by more than ½ chip over the correlation interval for at least one of the hypotheses.

Multiple first comparators 402 may be included, one for each correlator 418 as shown in FIG. 4. Alternately, a single first comparator may be included and coupled to the plurality correlators 106 through a switch or multiplexer and used to compare each correlation result 114 to the threshold.

The apparatus 400 may also include a second comparator 404 coupled to the plurality of correlators 106 and configured to determine a largest correlation result 410. The largest correlation result may be used, for example, to determine the code frequency offset of the received spread spectrum transmission. Accordingly, the apparatus may also include an estimator 412 configured to determine the estimated code frequency offset 414. For example, the estimated code frequency offset may be chosen to correspond to the code frequency offset hypothesis which produced the largest correlation result. Alternately, the estimator may include an interpolator to interpolate between the largest correlation result and two or more adjacent correlation results to determine the estimated code frequency offset. For example, since the correlation result typically varies linearly with code frequency offset, a linear interpolation may be performed.

The estimator may be coupled to a local code generator 308 to adjust a code frequency of the local code generator to match the estimated code frequency offset. Hence, the resulting adjusted local code 416 will more closely track the received spread spectrum transmission. The adjusted local code may be used for despreading and demodulation. By adjusting the frequency of the local code to that of the received spread spectrum transmission, improved performance may be obtained in a demodulator.

An additional advantage provided by the apparatus 400 is the ability to perform longer correlation. Prior correlators have often been limited in length due to the loss of signal to noise ratio caused by phase drift during the correlation interval. Since the apparatus compensates for phase drift during the correlation (by moving the tap location), less loss results, and longer correlation intervals are possible. Hence, higher signal to noise ratio can be obtained at the output of the correlator. This higher signal to noise ratio can be used, for example, to provide improved performance of a receiver, permit a reduction in a transmitter power, or to extend the range of a communication system.

Figure 5:
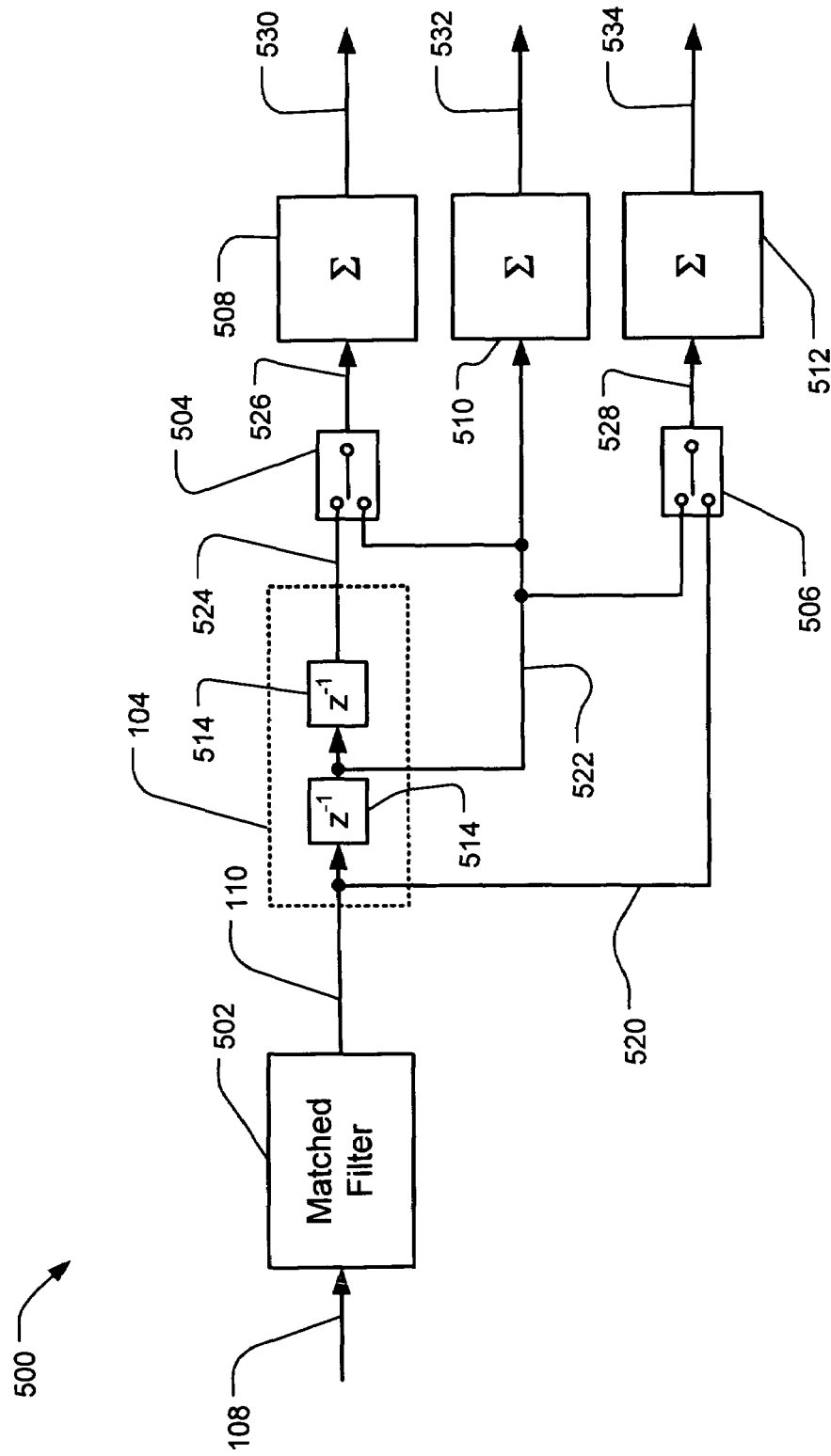
FIG. 5 is a block diagram of an apparatus for correlating a signal over a correlation interval in accordance with another embodiment of the present invention.

As illustrated in FIG. 5, in accordance with an alternate embodiment of the present invention, an apparatus for correlating a signal over a correlation interval while accommodating spreading code frequency offset is shown. The apparatus 500 accepts an input signal 108 which is processed by a matched filter 502 to produce signal samples 110. The signal samples are delayed by a tapped delay line 104 to produce early 524, nominal 522 and late 520 samples. As shown here, the tapped delay line may be implemented by two single sample delays 514, so that the nominal samples are delayed relative to the early samples, and the late samples are delayed relative to the nominal samples.

Figure 6:
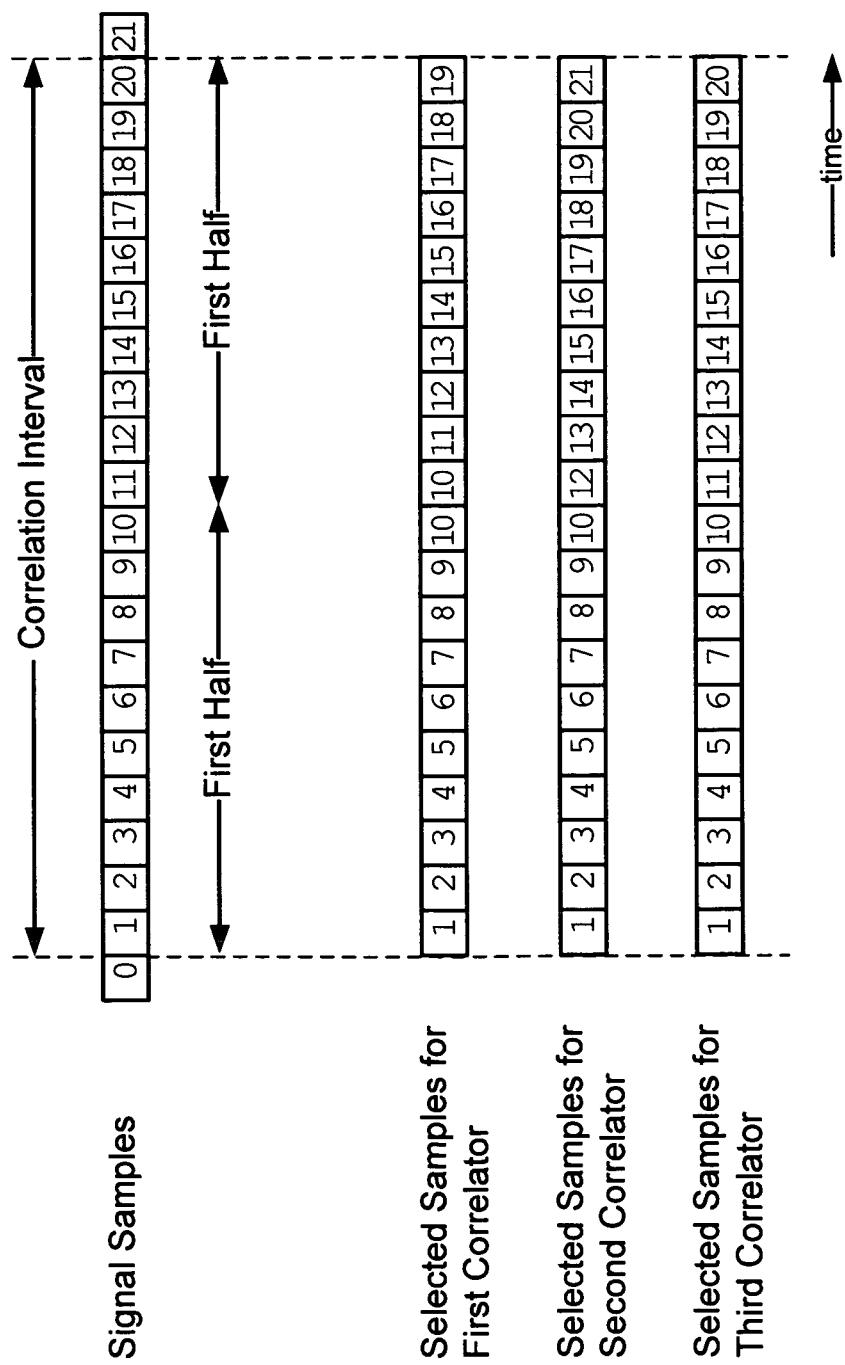
FIG. 6 is a tabulation of signal samples spanning a correlation interval and specific subsets selected for each of three correlators in accordance with an embodiment of the present invention.

The apparatus includes means for selecting a plurality of selected samples corresponding to the correlation interval. For example, a first switch 504 is coupled to the tapped delay line 104 and outputs nominal samples 522 during the first half of the correlation interval and outputs early samples 524 during the second half of the correlation interval. This corresponds to a positive code frequency offset hypothesis. In other words, the code phase is expected to drift earlier in time during the correlation interval. This is shown in FIG. 6, which shows the signal samples spanning the correlation interval and the specific subsets selected for each of the three correlators. The effect of the first switch switching from the nominal to the early samples is to advance the effective sample timing midway through the correlation. This is accomplished by reusing signal sample number 10. This is equivalent to compressing time during the correlation, for example to compensate for a positive Doppler shift on the incoming signal. The first selected samples 526 (at the output of the first switch 504) are provided to a means for correlation, for example a first summer 508, which forms a first correlation result 530.

A second switch 506 is coupled to the tapped delay line and outputs nominal samples during the first half of the correlation interval and outputs late samples 520 during the second half of the correlation interval. This corresponds to a negative code frequency offset hypothesis (code phase drifting later in time). Hence, signal sample number 11 is skipped midway through the correlation interval. This is equivalent to expanding time during the correlation, for example to compensate for a negative Doppler shift on the incoming signal. The second selected samples 528 (at the output of the second switch) are provided to a second summer 512 which forms a second correlation result 534.

Finally, a third summer 510 is coupled to the delay line, so as to receive nominal samples. Hence, this corresponds to a zero code frequency offset hypothesis (no code phase drift) and thus the selected signal samples are the nominal samples 522 spanning the correlation interval, used in order. The third summer sums the nominal samples spanning the correlation interval to form a third correlation result 532.

As an alternate, the first switch 504 and second switch 506 can be configured to switch in the opposite directions. That is, the first switch can switch from early samples 524 in the first half of the correlation interval to nominal samples 522 in the second half, and the second switch can switch from late samples 520 to nominal samples. In this case, the first correlation result 530 corresponds to a negative Doppler shift and the second correlation result 532 corresponds to a positive Doppler shift. This alternate arrangement may provide an advantage in that the three correlation results correspond to hypotheses having the same phase at the end of the correlation interval.

Figure 7:
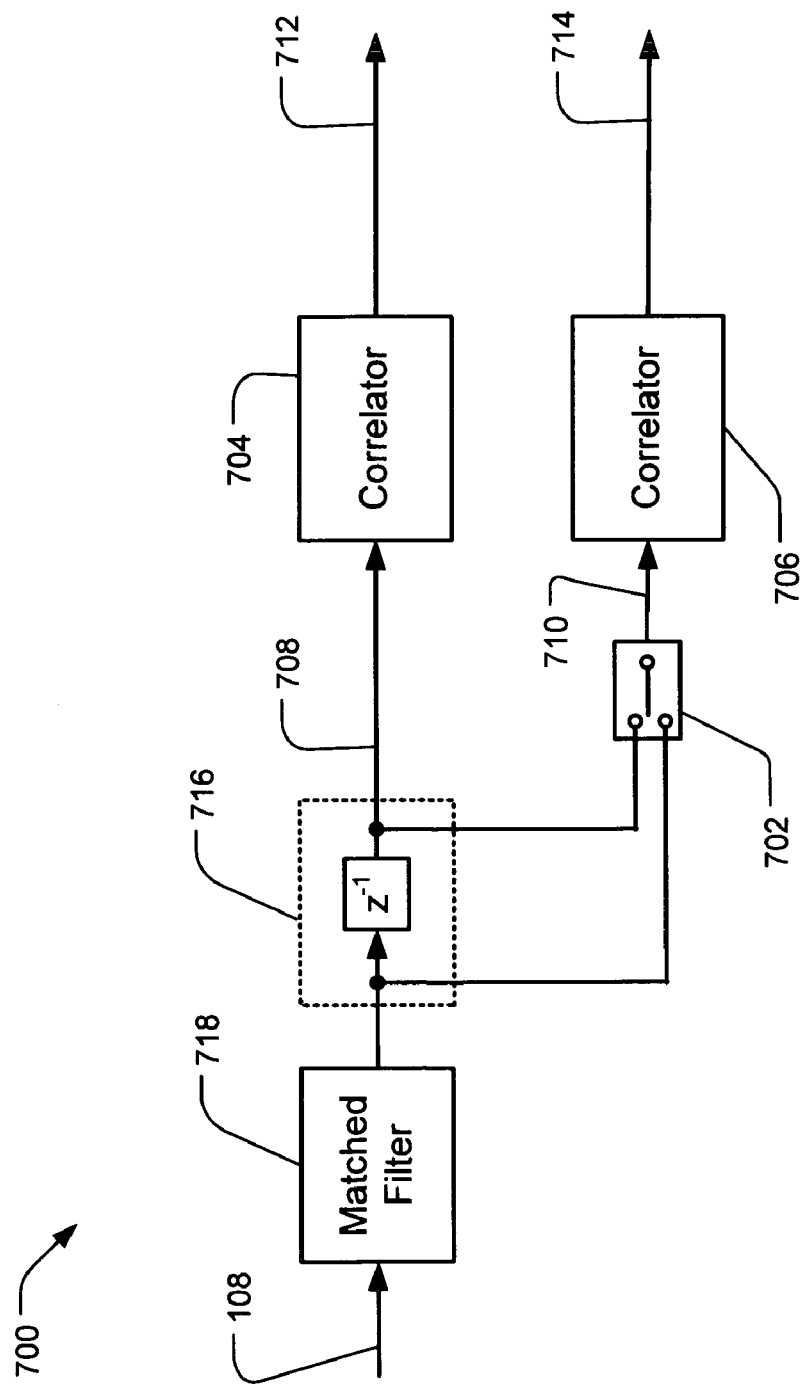
FIG. 7 is a block diagram of an apparatus for correlating an input signal over a correlation interval in accordance with another embodiment of the present invention.

One of the three summers 508, 510, 512 and associated circuitry (e.g. one of the switches 504 or 506) can be eliminated to reduce the complexity of the circuitry, providing an alternate embodiment of the present invention. Furthermore, if either the positive or negative hypothesis is eliminated, the tapped delay line 104 can be shorted to a single stage of delay. For example, FIG. 7 illustrates an apparatus 700 for correlating an input signal over a correlation interval in accordance with another embodiment of the present invention. The input signal 108 is provided, through an optional matched filter 718, to a delay unit 716, which provides a delayed signal 708. A first correlator 704 is coupled to the tapped delay line, and accepts the delayed signal to form a first correlation result 712. A second correlator 706 is coupled to a switch 702, and forms a second correlation result 714 from a selected signal 710 output by the switch. The switch is configured to select the delayed signal during a first half of the correlation interval, and to select the input signal during a second half of the correlation interval to form the selected signal. Hence, the first correlation result corresponds to a zero code frequency offset hypothesis, and the second correlation result corresponds to a positive code frequency offset hypothesis.

The apparatus 700 may be rearranged to perform equivalent functions by connecting the first correlator directly to the input signal 108. The apparatus 700 may also be rearranged to perform equivalent functions by having the switch 702 select the input signal during the first half of the correlation interval and select the delayed signal during the second half of the correlation interval. As just described, the second correlation result corresponds to a negative code frequency offset hypothesis.

For arrangements of the apparatus 700 as just described, operation may be enhanced by biasing the local code frequency generator slightly positive or negative so as to place the two code frequency offset hypotheses equally spaced to each side of the expected code frequency of the input signal. The apparatus is also equally suitable for use with digital (sampled, discrete time) or analog (continuous time) input signals.

The apparatus 700 may optionally include a matched filter 718 to perform matched filtering on the signal before input to the delay unit and correlators. The matched filter may be configured to perform despreading of the input signal, in which case the correlators may be implemented using integrators. For example, a digital matched filter can be implemented using a finite impulse response filter as discussed above, and an analog matched filter can be implemented using a surface acoustic wave device.

Figure 8:
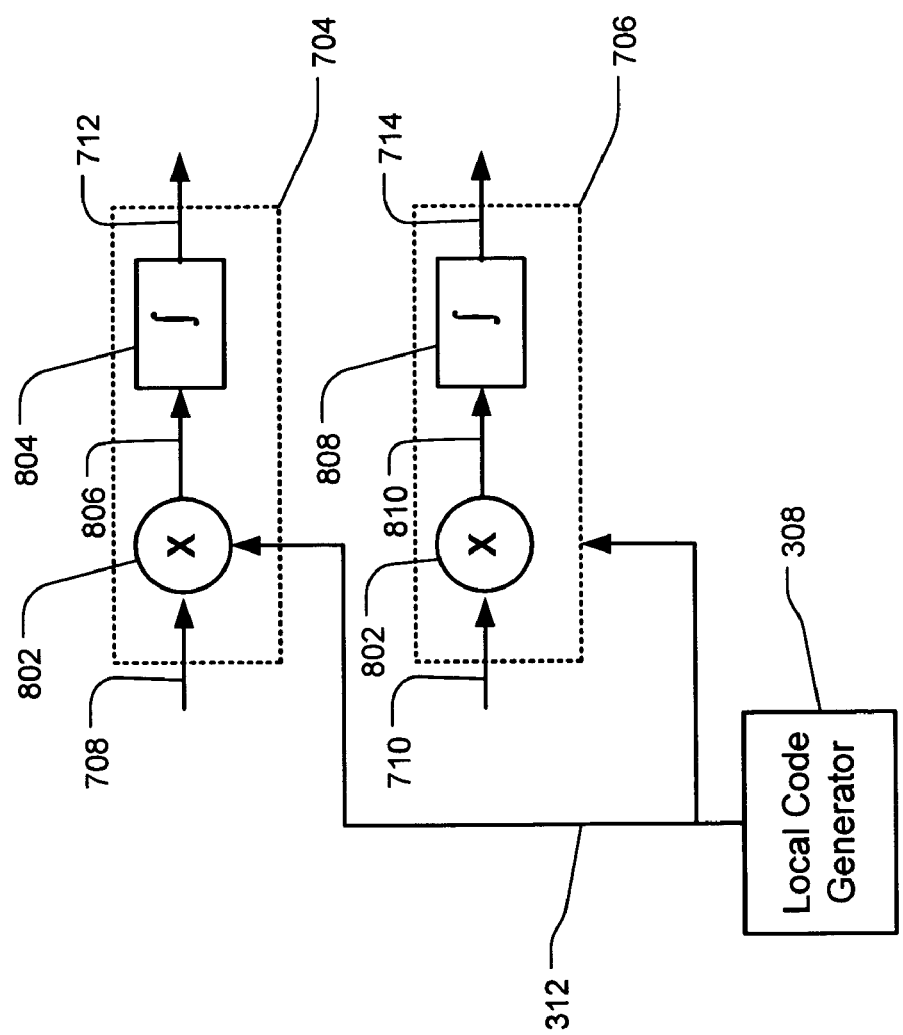
FIG. 8 is a block diagram of a correlator in accordance with another embodiment of the present invention.

Means for correlating may be implemented by correlators 704, 706 as will now be described in further detail with reference to FIG. 8. The correlators may include a multiplier 802 and integrator 804. For example, the multiplier may be implemented by a mixer (for an analog signal) or by a digital multiplier, exclusive-or gate, or similar (for a digital input signal). The integrator may be implemented by an integrating amplifier (for an analog input signal), or by a summer (for digital input signals). Various other ways of implementing the multiplier and integrator will occur to one of skill in the art.

The delay signal 708, and selected signal 710 are multiplied by the local code 312 (generated by the local code generator 308) to form first 806 and second 814 multiplied signals, respectively. The multiplied signals are then integrated by integrators 804 and 808 to form a first 712 and second 714 correlation result.

Although the preceding discussion has focused primarily on hardware implementations of embodiments of the present invention, the techniques may also be implemented using a general purpose processor or digital signal processor combined with executable machine instructions.

Figure 9:
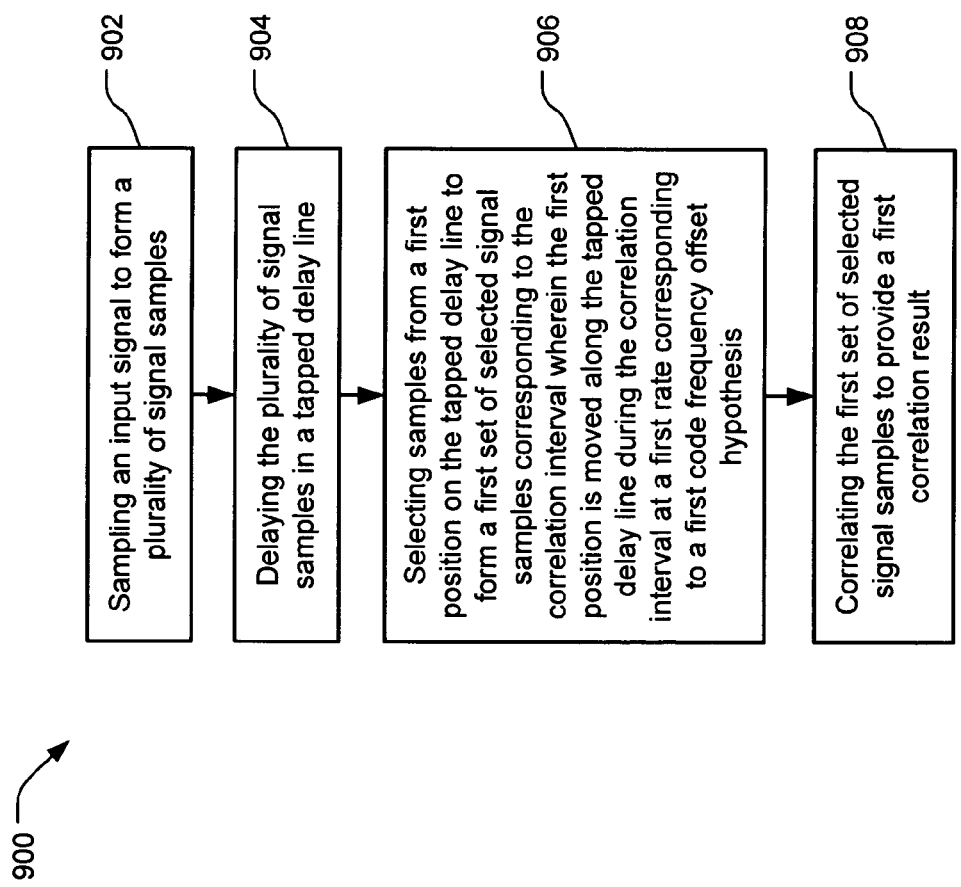
FIG. 9 is a flow chart of a method for correlating a signal over a correlation interval in accordance with an embodiment of the present invention.

A method 900 for correlating a signal over a correlation interval while accommodating spreading code frequency offset is illustrated in flow chart form in FIG. 9 in accordance with an embodiment of the present invention. One operation of the method is sampling 902 an input signal to form a plurality of signal samples. This operation may be performed, for example, with a sampler or analog to digital converter as discussed above. Another operation of the method is delaying 904 the plurality of signal samples in a tapped delay line, for example as discussed above. A further operation of the method is selecting 906 samples from a first position on the tapped delay line to form a first set of selected signal samples corresponding to the correlation interval wherein the first position is moved along the tapped delay line during the correlation interval at a first rate corresponding to a first code frequency offset hypothesis. For example, the first position may be moved along the tapped delay line by using a switch coupled to multiple taps on the tapped delay line as discussed above. Yet another operation of the method is correlating 908 the first set of selected signal samples to provide a first correlation result. For example, correlation may be performed using a summer, an integrator, or a multiplier and accumulator as discussed above. The method may also include filtering the plurality of signal samples, for example with a matched filter as discussed above.

The method 900 may also provide for searching of multiple code frequency offset hypotheses by including the operation of selecting samples from additional positions (e.g., a second position, third position, etc.) on the tapped delay line and correlating the selected samples to form additional correlation results (e.g., a second correlation result, third correlation result). For example, correlations may be performed for two, three, or more hypotheses, where for each hypothesis the position is moved (including holding at a fixed position, for the case of a zero code frequency offset) along the tapped delay line corresponding to a drift rate commensurate with the hypothesized code frequency offset.

More specifically, the method 900 may include the operations of selecting samples from first, second, and third positions on the tapped delay line where the third position is fixed, and the first and second positions move at equal rate in opposite directions. This corresponds to a zero, a positive, and a negative code offset frequency hypotheses. These operations can be implemented, for example, as described above in conjunction with FIG. 5.

The presence of spread spectrum signal transmissions within the signal may be detected by the operation of comparing the correlation results to a threshold, for example using a comparator as discussed above. A most likely code frequency offset hypothesis can be determined by comparing the correlation results. An estimated code frequency offset can be obtained by interpolating the correlation results. Finally, code frequency offset hypothesis can be compensated for (e.g., within a demodulator) by adjusting the rate of a local code reference generator based on the estimated code frequency offset.

Summarizing, and reiterating to some extent, a technique for accommodating spreading code offset while correlating a signal has been invented. The technique includes delaying the signal, for example, in a tapped delay line, to produce delayed versions of the signal. The correlation is performed, selecting from the delayed versions of the signal, so as to compensate for phase drift between a local code reference and a hypothesized code frequency offset of a spread spectrum encoded transmission within the signal. Using this technique, relatively simple hardware can accommodate simultaneous correlation for a number of different code frequency offset hypotheses. By accommodating code frequency offset, the signal to noise ratio of the correlation result may be improved, providing improved detection probability.

It is to be understood that the above-referenced arrangements are illustrative of the application for the principles of the present invention. It will be apparent to those of ordinary skill in the art that numerous modifications can be made without departing from the principles and concepts of the invention as set for in the claims.

What is claimed is:

1. An apparatus for correlating a signal over a correlation interval while accommodating spreading code frequency offset comprising:
    a sampler configured to accept the signal and form a plurality of signal samples;
    a tapped delay line coupled to the sampler and configured to accept the plurality of signal samples and output delayed signal samples at a plurality of taps, wherein successive taps provide an increased relative delay to the signal samples; and
    a plurality of correlators coupled to the tapped delay line, each correlator configured to form a correlation result from a plurality of selected delayed signal samples corresponding to the correlation interval, the plurality of selected delayed signal samples taken from a tap location that is moved along the tapped delay line during the correlation interval at a rate corresponding to a correlator unique code frequency offset hypothesis;

wherein the plurality of correlators comprise:

a second correlator coupled to the tapped delay line and configured to select a second plurality of selected delayed signal samples from a second tap location moved along the tapped delay line during the correlation interval at a positive phase drift hypothesis; and a third correlator coupled to the tapped delay line and configured to select a third plurality of selected delayed signal samples from a third tap location moved along the tapped delay line during the correlation interval at a negative phase drift hypothesis opposite to the positive phase drift hypothesis.

2. The apparatus of claim 1 wherein the plurality of correlators comprise a first correlator coupled to the tapped delay line and configured to select a first plurality of selected delayed signal samples from a first fixed tap location.

3. The apparatus of claim 1 wherein the sampler further comprises a matched filter configured to perform a matched filtering operation on the signal and output signal samples which have been matched filtered, and each of the plurality of correlators comprises a summer configured to sum the plurality of selected delayed signal samples.

4. The apparatus of claim 1 wherein each of the plurality of correlators comprises:

a sample selector coupled to the tapped delay line and configured to select the selected delayed signal samples;

a multiplier coupled to the sample selector and configured to multiply the selected delayed signal samples by a local code reference to form multiplied samples; and a summer coupled to the multiplier and configured to sum the multiplied samples to form a correlation result.

5. The apparatus of claim 1 wherein the plurality of correlators comprise:

a first correlator coupled to the tapped delay line and configured to select a first plurality of selected delayed signal samples from a first fixed tap location; and at least one second correlator coupled to the tapped delay line and configured to select a second plurality of selected delayed signal samples from the first fixed tap location during a first portion of the correlation interval and from a second fixed tap location during a second portion of the correlation interval.

6. The apparatus of claim 5 wherein the at least one second correlator comprises a switch coupled to the tapped delay line and configured to select delayed signal samples from the first fixed tap location during the first portion of the correlation interval and from the second fixed tap location during the second portion of the correlation interval and output selected delayed signal samples.

7. The apparatus of claim 5 wherein the first portion precedes the second portion in time.

8. The apparatus of claim 5 wherein the first portion corresponds to a first half of the correlation interval and the second portion corresponds to a second half of the correlation interval.

9. The apparatus of claim 5 wherein the second fixed tap location has increased delay relative to the first fixed tap location.

10. The apparatus of claim 1 further comprising a first comparator coupled to the plurality of correlators and configured to compare the correlation results to a threshold to detect the presence of a spread spectrum signal.

11. The apparatus of claim 1 further comprising a second comparator coupled to the plurality of correlators and configured to determine a largest correlation result.

12. The apparatus of claim 1 further comprising an estimator coupled to the plurality of correlators and configured to determine an estimated code frequency offset of the signal.

13. The apparatus of claim 12 further comprising a local spreading code generator coupled to the estimator wherein a code frequency of the local spreading code generator is adjusted based on the estimated code frequency offset.

14. The apparatus of claim 1 wherein the increased relative delay is selected from the group consisting of one chip time, one-half chip time, and one-quarter chip time.

15. An apparatus for correlating a signal over a correlation interval while accommodating spreading code frequency offset comprising:

a matched filter configured to accept the signal and output a plurality of signal samples;

a tapped delay line coupled to the matched filter and configured to accept and delay the signal samples to produce a plurality of early samples, nominal samples, and late samples, wherein the nominal samples are delayed relative to the early samples, and the late samples are delayed relative to the nominal samples;

a first switch coupled to the tapped delay line and configured to output first selected samples wherein the first selected samples are nominal samples during a first half of the correlation interval and the first selected samples are early samples during a second half of the correlation interval;

a first summer coupled to the first switch and configured to sum the first selected samples spanning the correlation interval to form a first correlation result;

a second switch coupled to the tapped delay line and configured to output second selected samples wherein the second selected samples are nominal samples during the first half of the correlation interval and the second selected samples are late samples during the second half of the correlation interval;

a second summer coupled to the second switch and configured to sum the second selected samples spanning the correlation interval to form a second correlation result; and a third summer coupled to the tapped delay line and configured to sum the nominal samples spanning the correlation interval to form a third correlation result.

16. The apparatus of claim 15 wherein the matched filter comprises a finite impulse response filter with taps set equal to a conjugate of the spreading code.

17. An apparatus for correlating an input signal over a correlation interval while accommodating spreading code frequency offset comprising:

a delay unit configured to accept the input signal and output a delayed signal;

a switch coupled to the delay unit and configured to output a switched signal wherein the switched signal is the input signal during a first portion of the correlation interval and the switched signal is the delayed signal during a second portion of the correlation interval;

a first correlator coupled to the delay unit and configured to form a first correlation result from one of either the input signal or the delayed signal; and a second correlator coupled to the delay unit and configured to form a second correlation result from the switched signal, a matched filter configured to perform matched filtering on the signal, wherein the first correlator comprises an integrator configured to integrate the signal over the correlation interval and the second correlator comprises an integrator configured to integrate the switched signal over the correlation interval.

18. The apparatus of claim 17 wherein the first correlator comprises:
a first multiplier configured to multiply the signal by a local code reference to form a multiplied signal, and
a first integrator coupled to the first multiplier and configured to integrate the multiplied signal over the correlation interval; and wherein the second correlator comprises:
a second multiplier configured to multiply the switched signal by the local code reference to form a multiplied switched signal to form the first correlation result, and
a second integrator coupled to the second multiplier and configured to integrate the multiplied switched signal over the correlation interval to form the second correlation result.

19. The apparatus of claim 17 wherein the first portion of the correlation interval is the first half of the correlation interval and the second portion of the correlation interval is the second half of the correlation interval.

20. An apparatus for correlating a signal over a correlation interval while accommodating spreading code frequency offset comprising:
means for forming a plurality of signal samples from the signal;
means for delaying the signal samples to produce a plurality of delayed sample streams, each successive delayed sample stream having an increased relative delay;
means for selecting a plurality of selected samples corresponding to the correlation interval wherein the plurality of selected samples is selected from a first delayed sample stream during a first portion of the correlation interval and selected from a second delayed sample stream during a second portion of the correlation interval so as to compensate for a hypothesized phase drift; and
means for correlating the plurality of selected samples to form a correlation result.

21. The apparatus of claim 20 wherein the first portion of the correlation interval is a first half of the correlation interval and the second portion of the correlation interval is a second half of the correlation interval.

22. The apparatus of claim 20 wherein the means for forming a plurality of signal samples comprises means for matched filtering the signal, and wherein the means for correlating the plurality of selected samples comprises means for summing the plurality of selected samples.

23. A method of correlating a signal over a correlation interval while accommodating spreading code frequency offset comprising:
sampling the signal to form a plurality of signal samples;
delaying the plurality of signal samples in a tapped delay line;
selecting samples from a first position on the tapped delay line to form a first set of selected signal samples corresponding to the correlation interval wherein the first position is moved along the tapped delay line during the correlation interval at a first rate corresponding to a first code frequency offset hypothesis; and
correlating the first set of selected signal samples to provide a first correlation result;
selecting samples from a second position on the tapped delay line to form a second set of selected signal samples corresponding to the correlation interval wherein the position is moved along the tapped delay line during the correlation interval at a second rate corresponding to a second code frequency offset hypothesis; and
correlating the second set of selected signal samples to provide a second correlation result.

24. The method of claim 23 further comprising matched filtering the plurality of signal samples and wherein correlating the first set of selected signal samples comprises summing the first set of selected signal samples to form the first correlation result.

25. The method of claim 23 wherein correlating the first set of selected signal samples comprises:
multiplying the first set of selected signal samples by a local code reference to form multiplied samples; and
summing the multiplied samples to form the first correlation result.

26. The method of claim 23 further comprising comparing the first correlation result to a threshold to detect the presence of a spread spectrum signal.

27. The method of claim 23 wherein the first rate and second rate are equal in magnitude and opposite in direction.

28. The method of claim 23 further comprising:
selecting samples from a third position on the tapped delay line to form a third set of selected signal samples corresponding to the correlation interval, wherein the third position is fixed at a particular tap position on the tapped delay line; and
correlating the third set of selected signal samples to provide a third correlation result.

29. The method of claim 28, further comprising comparing the first correlation result, second correlation result, and third correlation result to determine a most likely code frequency offset hypothesis.

30. The method of claim 28, further comprising interpolating the first correlation result, second correlation result, and third correlation result to determine an estimated code frequency offset of the signal.

31. The method of claim 30, further comprising adjusting a rate of the local code reference based on the estimated code frequency offset.

* * * * *

UNITED STATES PATENT AND TRADEMARK OFFICE
CERTIFICATE OF CORRECTION

PATENT NO. : 7,664,164 B1
APPLICATION NO. : 11/351465
DATED : February 16, 2010
INVENTOR(S) : Giallorenzi et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1038 days.

Signed and Sealed this

Thirtieth Day of November, 2010

David J. Kappos
*Director of the United States Patent and Trademark Office*